United States Patent [19]

Schouten et al.

[11] 3,911,051

[45] Oct. 7, 1975

[54] CROSS-LINKED ULTRA HIGH MOLECULAR WEIGHT POLYETHYLENE AND S-B COPOLYMER COMPOSITION AND PROCESS FOR MOLDING

[75] Inventors: James J. Schouten, Glenn Ellyn; Robert V. Wargin, Darien, both of Ill.

[73] Assignee: The Richardson Company, Des Plaines, Ill.

[22] Filed: Apr. 25, 1974

[21] Appl. No.: 464,049

[52] U.S. Cl. ......... 260/876 B; 260/876 R; 260/889
[51] Int. Cl. ............................................ C08f 41/12
[58] Field of Search ............ 260/876 R, 876 B, 889

[56] References Cited
UNITED STATES PATENTS

| | | | |
|---|---|---|---|
| 2,832,748 | 4/1958 | Safford et al. | 260/889 |
| 2,910,451 | 10/1959 | Cantwell | 260/889 |
| 3,478,132 | 11/1969 | Randolph | 260/889 |
| 3,597,499 | 8/1971 | Daumiller et al. | 260/876 |

Primary Examiner—Murray Tillman
Assistant Examiner—C. J. Seccuro
Attorney, Agent, or Firm—Alan M. Abrams; Robert E. Sloat

[57] ABSTRACT

There is described herein a modified ultra-high molecular weight polyethylene composition which, in a preferable instance, is suitable for molding into desired shapes. More particular, this disclosure describes the composition utilizing an ultrahigh molecular weight polyethylene having a molecular weight in excess of about 1.5 million and additionally containing cross-linking hydrocarbon binder and cross-linking catalyst to enhance the cross-linking of the binder. By using the disclosed composition, it is possible to mold products directly at low pressures without having to utilize a long, time consuming molding procedure as is presently utilized for most known molding applications of the ultra-high molecular weight polyethylene materials.

19 Claims, No Drawings

CROSS-LINKED ULTRA HIGH MOLECULAR WEIGHT POLYETHYLENE AND S-B COPOLYMER COMPOSITION AND PROCESS FOR MOLDING

BACKGROUND OF THE INVENTION

1. Field of the Invention

The field of art to which this invention pertains is ultra-high molecular weight polyethylene compositions. In particular the present invention relates to the use of an ultra-high molecular weight polyethylene having a molecular weight, as defined and determined herein, in excess of about 1.5 million in combination with cross-linking binder, catalyst and optional cross-linking monomer.

2. Description of the Prior Art

The ultra-high molecular weight polyethylene, hereinafter UHMW PE, presently supplied by the manufacturers in this country and in Europe are fairly well known to consist of those materials having an average viscometrically determined molecular weight of over about 1.5 million. Various materials have been combined with such UHMW PE to produce products having altered physical and molding properties. In particular materials which have been added to the UHMW PE include fillers such as silicates, clay, coal dust or other similar materials. However, in many instances, the inert fillers reduce certain desirable properties of the UHMW PE. In other instances, in which plasticizers or processing oils are added to the UHMW PE, the molded product has a characteristic oily or tacky surface-the result of migration to the surface of the molded product of the processing oils or plasticizers.

Even without such filler materials, processing oils or plasticizers, UHMW PE is very difficult to process into shapes and is often sintered like fluorocarbons or melted at temperatures as high as 600°F. with operating pressures during the molding operation in the order of 1500 to 4000 or more psi. The preparation of thin sections by direct compression molding of the UHMW PE powder with or without the additional forementioned modifying materials is a technically very difficult and uneconomical operation because of the high melt viscosity of the UHMW PE. Also parts produced using the UHMW PE must be cooled carefully after processing in order to prevent cracks, depressions and deformation of the molded product.

In comparing the molding operations for UHMW PE without the use of additive materials with UHMW PE compositions as described and claimed herein, obvious advantages can be appreciated. Rough comparison of the molding operations for a one inch slab of the two above compositions is as follows: The UHMW PE material without additives generally takes about three to four hours for molding while most of the compositions claimed herein take forty minutes or less. The pressures for the molding operation for the UHMW PE require, in many instances, in excess of 1500 psi in the mold while as little as 100 psi can be used on the claimed composition. Additionally, mold temperatures when using the straight UHMW PE range anywhere from about 400° to 450° and thus the UHMW PE is subjected to oxidation while the temperatures contemplated for molding the presently claimed composition are lower ranging anywhere from above around 225° to 350°F.

One of the most important advantages obtained when molding the claimed composition is that after molding, the part produced need not be cooled in the mold. The straight UHMW PE material must, in most instances, remain in the mold for a programmed cooling period in order to prevent deformation of the part during its cooling stages. Another advantage obtained when molding the claimed composition, is that, in most instances, the pressure cycle utilized to produce the finished and molded product comprises a single continuous pressure while, in many instances, when molding a straight or filled UHMW PE material the pressure cycles will vary from 0 to as much as 1500 psi, so called "bouncing" the mold, during the molding and cooling operations of the molded part. Additionally the properties of the UHMW PE are retained using the claimed composition.

Still another advantage in utilizing the presently claimed composition is that the molding characteristics of such claimed compositions allow direct molding of parts which up to the present time must be machined from large stock slabs of UHMW PE resulting in considerable waste.

SUMMARY OF THE INVENTION

The present composition can be summarized as a three component composition having from about 50 to about 100 parts by weight of a polyethylene having a molecular weight greater than about 1.5 million, from about 1 to 50 parts by weight of cross-linking hydrocarbon binder and from about 1/10 to about 5 parts by weight of cross-linking catalyst.

In a broad embodiment, the present invention comprises a curable composition comprising a blend of from about 50 to about 99 parts by weight of a polyethylene polymer having a molecular weight of greater than about 1.5 million; from about 1 to about 50 parts by weight of cross-linking hydrocarbon binder selected from the group consisting of copolymers of butadiene and styrene; graft copolymers of butadiene and styrene, graft copolymers of butadiene and vinyl toluene, and A-B block copolymers of butadiene and styrene; and, from about 0.1 to about 5 parts by weight of cross-linking catalyst.

In another broad embodiment our invention resides in a process for molding articles from a polyethylene polymer having a molecular weight of greater than about 1.5 million, which process comprises:

A. placing a blend of:
1. from about 50 to about 99 parts by weight of said polyethylene;
2. from about 1 to about 50 parts by weight of a cross-linking hydrocarbon binder selected from the group consisting of copolymers of butadiene and vinyl aromatics, graft copolymers of butadiene and vinyl aromatics, an A-B block copolymer of butadiene and vinyl aromatics; and
3. from about 1/10 to about 5 parts by weight of a cross-linking catalyst; into a suitable mold;

B. polymerizing said blend at polymerizing conditions including a molding temperature above about 150°F to form a molded product; and C. removing said molded product from the mold prior to substantial cooling of the molded product.

DETAILED DESCRIPTION OF THE INVENTION

Ultra-high molecular weight polyethylene, UHMW PE, is known for its high resistance to repeated stress and its extremely high impact strength. Also UHMW PE has excellent abrasion resistance and a low coefficient of friction. However, it is difficult to process into shapes and is often sintered like fluorocarbons or melted at temperatures as high as 600°F with operating pressures on the order of 1500 to 4000 psi. Preparation of thin sections by direct compression molding of UHMW PE is a technically very difficult and uneconomical operation because of the high melt viscosity of the UHMW PE. Also the parts must be cooled carefully after processing. In many instances, the cooling takes place within the mold itself in order to prevent formation of cracks and depressions and deformation of the molded part during cooling. Plasticizers and processing oils have been used to improve processing but, in many instances, these materials are not very compatible with the UHMW PE.

Notwithstanding the above deficiencies with respect to molding operations, UHMW PE materials are primarily used because of the following generally recognized high quality properties: abrasion resistance, high slip, high impact resistance, low noise transmission, chemical inertness. While half of the U.S. market at the present time is utilized in material handling equipment such as conveyor liners, grain, coal and ore shoots and bins and in bottling machinery, the greatest single use of specific parts is in the manufacture of snowmobiles used in sprockets and tread conveyors. Additional uses include textile and paper machinery, ski runners, slide strips, sound deadeners, etc.

The ultra-high molecular weight polyethylenes are also referred to as very high molecular weight polyethylenes and for the purposes of this disclosure will be referred to as UHMW PE.

Typically polyethylene is commercially produced in a wide range of molecular weights and sold for different applications as follows: normal high density polyethylene has a molecular weight of from about 100,000 to about 500,000; high molecular weight polyethylene has a molecular weight of from around 500,000 to about 1,000,000 while the ultra-high or very high molecular weight polyethylene has a molecular weight in excess of around 1.5 million and can vary from around 1.5 to about 5 million or more molecular weight.

For the purposes of this disclosure the ultra-high molecular weight polyethylene shall include a polyethylene having a molecular weight, measured as a viscosity molecular weight, exceeding around 1.5 million or more. In a preferable instance the UHMW PE combination has a viscosity molecular weight exceeding about 1.7 million and less than about 5 million.

UHMW PE available in this country and abroad includes materials such as HiFax 1900 produced by Hercules Power Co., Allied Chemical's AC 1220, and the extra high molecular weight polyethylenes of the Phillips Petroleum Co. The HiFax 1900 has a molecular weight range of from about 2 to about 5 million. AC 1220, made by Allied Chemical, is manufactured with an average molecular weight of about 1.5 to 2 million. The Phillips polymers have a somewhat lower molecular weight. Other known sources of the UHMW polyethylenes include such chemical producers as DuPont, Union Carbide, Cellonese, U.S.I., and Rexall. Foreign sources of UHMW polyethylenes include Hoechsts Hostalen GUR powder, which has a molecular weight range very similar to that of the HiFax 1900 material.

The molecular weights for UHMW PE generally are determined using either intrinsic viscosity measurements or by light scattering procedures. The latter method generally gives higher results.

The above described UHMW polyethylene is blended with crosslinking hydrocarbon binder that allows the polyethylene to be processed by any conventional processing technique. The polyethylene, preferably a powder, acts like a filler material. The crosslinking hydrocarbon binder reacts when processed to add thermosetting properties to the final composition.

The cross-linking hydrocarbon binder is preferably any hydrocarbon material which, upon subjection to reaction conditions in the presence of a cross-linking catalyst, can be polymerized forming cross-linkages between the individual binder units to add strength to the system. This includes sulfur cures of SBR and diazo based systems. In a preferable instance the cross-linking hydrocarbon binder is selected from the group consisting of copolymers of butadiene and styrene, graft copolymers of butadiene and styrene, graft copolymers of butadiene and vinyl toluene, and A-B block copolymers of butadiene and styrene.

The copolymers of butadiene and styrene should contain butadiene having at least 50 percent 1,2 vinyl unsaturation with the remaining butadiene being of the 1,4 configuration. Representative copolymers of butadiene and styrene are shown in equation 1 below:

(1)

wherein the ratio of m to n can vary from about 20 to about 1/20 and the sum of m and n in the copolymer chain can vary from about 20 to about 2000.

In some instances the above butadiene and styrene copolymer can have substituted thereon alkyl or alkenyl components on either the aromatic or in the backbone or the pendant vinyl grouping within the above described formulation.

In another instance the hydrocarbon cross-linking binder can be selected from graft copolymers of butadiene and styrene as indicated in equation 2 below:

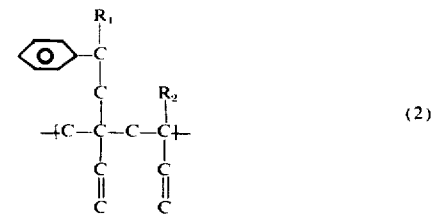

(2)

wherein $R_1$ can be hydrogen or another styrene structure or an alkyl structure and $R_2$ can be hydrogen, styrene or a recurring structure having structural formula similar to polymeric styrene or vinyl toluene or any alkyl substituted vinyl aromatic material. In the above polymeric structure the molecular weight can vary from about 2000 up to about 2,000,000. Preferably the molecular weight can vary from 2000 to 100,000 and even more preferably from 2000 to 50,000. The pendant vinyl groupings can be substituted with alkyl or similar groups. In all instances, such substitutions should not degrade the properties of the basic structure defined above. The preferable structure above should contain more than 50 percent of the butadiene component in the 1,2 configuration with the remaining butadiene as the 1,4 material.

The cross-linking hydrocarbon binder can also be a graft copolymer of butadiene and a vinyl aromatic. The structure of such a cross-linking hydrocarbon binder is shown in equation 3 below:

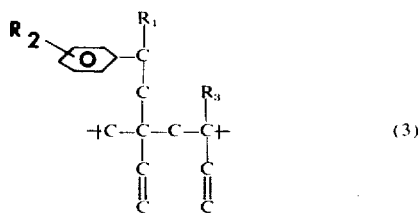

(3)

wherein $R_1$ and $R_3$ are hydrogen, a structure having the structure of a vinyl aromatic polymeric substance or an alkyl material and $R_2$ is any alkyl having from 1 to about 10 carbon atoms. In some instances there may be alkyl or other hydrocarbon substituent materials placed on the pendant vinyl groupings or elsewhere on the backbone chain but, however, such substitution, if at all present, should be selected so that it does not degrade the basic properties of the structure as defined above. The graft copolymer of butadiene and vinyl aromatic materials can vary in molecular weight from about 2000 up to about 2,000,000 and preferably will vary from 2000 to 100,000 and even more preferably from 2000 to 50,000.

The butadiene segment above should have at least 50 percent 1,2 configuration with the remaining butadiene being of the 1,4 structure.

Another specific example of a cross-linking hydrocarbon binder includes what is referred to in the art as A-B block copolymers of butadiene and vinyl aromatics. In particular such structures comprise repeating structures of butadiene followed by repeating structures of vinyl aromatics as shown in equation 4 below:

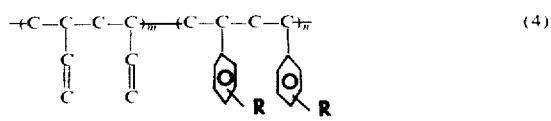

(4)

Such repeating structures are alternately placed in a polymeric chain that can have a molecular weight varying anywhere from about 2000 up to about 2,000,000 and preferably from 2000 to 100,000 and even more preferably from 2000 to 50,000. In the above described structure, R can be selected from any materials from the group of hydrogen or alkyls having from one up to about 10 carbon atoms with the vinyl pendant groupings also being capable of substitution with alkyl substitutions. M and n can vary depending upon the length of the individual A and B units of the A-B block copolymer and in a preferable instance m varies from 10 up to about 100 while n can vary from about 10 up to about 1000. Preferably the butadiene segment should primarily contain up to 95 percent 1,2 butadiene with the remaining butadiene segment comprising 1,4 butadiene.

The homopolymer butadiene sold as Ricon 150, the graft copolymers butadiene and styrene sold as Ricon 100, the graft copolymers of butadiene and styrene sold as Ricon 429 and the copolymers of vinyl toluene and butadiene sold as Ricon 431 can all be purchased from Colorado Chemical Specialties, Golden Colorado, and were also formerly sold by The Richardson Company.

In some instances the cross-linking hydrocarbon binder can be a mixture of one or more or all of the above enumerated polymeric substances.

The cross-linking hydrocarbon binder should be present in concentrations of anywhere from about 1 to about 50 parts on a weight basis. The preferable concentration of the A-B block copolymer, as described above, is about 10 parts by weight of the total composition. The concentration when using a copolymer of butadiene and styrene, as described in equation 1 above, can, in a preferable instance, be around 43 parts by weight.

Catalysts may be used to promote cross-linking of the crosslinking hydrocarbon binder and preferably are peroxide catalysts such as Vulcup R, Dicup T, Lubersol 101 and tertiarybutyl perbenzoate. Additionally other materials such as sulfur based catalysts can be used to initiate free-radicals which propagate more freeradicals and also react with the hydrocarbon cross-linking binder. In a preferable instance the catalyst is Vulcup R.

The organic peroxides which can be used as catalysts are used in curing the vinyl cross-linking hydrocarbon binders described above. Peroxides thermally cleave forming highly reactive "oxy" radicals which function by abstracting hydrogen atoms from the polymeric chain while the polymer radicals subsequently combine to form cross-links, or by adding across pendant vinyl groups to form polymerization type cross-links. It has been postulated that in low temperature cures of polybutadiene systems that oxy radicals abstract allylic hydrogen to form cross-linkers while the vinyl unsaturation is not activated. High temperature cures are also characterized by a cure mechanism where the vinyl bonds can copolymerize with a cross-linking monomer to form highly cross-linked and fusable masses.

Peroxide catalysts and in particular the peroxide cross-linking catalysts are characterized by their half lives, which is the time it takes one-half of any quantity of peroxide to decompose. Peroxides can be ranked in order of their activity by selecting a half life time, usually 10 hours, and determining the temperature necessary to bring about their decomposition. High temperature peroxides (equal and above $t_{10}$ of 105°C) are used in cures greater than 250°F and low temperature peroxides (below $t_{10}$ of 105°C) are used in cures less than about 250°F. Low temperature peroxides can also be used in multiple catalyst systems for a high temperature cure. In such instances they form gelled structures faster and moderate the reaction exotherm for a more controlled cure in a large mass.

Specific peroxide catalysts which can be utilized as crosslinking catalysts are benzoyl peroxide having a general structure as depicted in equation 5 below:

(5)

$t_{10}=72°C$

Methyl ethyl ketone peroxide as shown in equation 6 below:

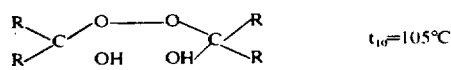  $t_{10}=105°C$  (6)

Tertiarybutyl perbenzoate as is shown in equation 7 below:

  $t_{10}=105°C$  (7)

Dicumyl peroxide (DiCup) as shown in equation 8 below:

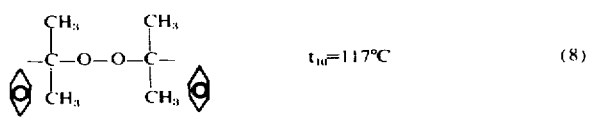  $t_{10}=117°C$  (8)

2,5-Di(T-butyl peroxy) 2,5-dimethyl hexane (Lupersol 101) as shown in equation 9 below:

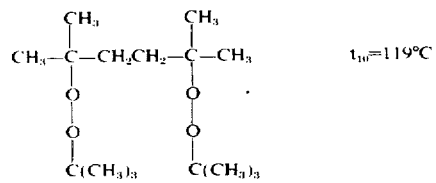  $t_{10}=119°C$  (9)

Ditertiary butyl peroxide as shown below:

$(CH_3)_3 C - O - O - C(CH_3)_3$  $t_{10}=126°C$ (10)

A,A'-bis(t-butylperoxy) diisopropylbenzene (Vulcup) as shown below:

$C(CH_3)_3 O - O - C(CH_3)_2 O C(CH_3)_2 O - O$
$C(CH_3)_3$  $t_{10}=127°C$ (11)

Other peroxide catalysts not specifically enumerated above may be utilized. Additionally other cross-linking catalysts known in the art can be used, such materials being known to those versed in the art.

The concentration of the catalysts very much depends upon the molecular weight of the catalyst, the type of catalyst used, the temperature of curing and the thickness of the molded part. In a preferred instance the catalyst should be anywhere from about 1/10 to about 5 or more parts by weight of the entire system.

An optional ingredient which dan be added, and in some instances is preferable to enhance the properties of the molded product, is what is referred to in the art as a cross-linking monomer. Such cross-linking monomer can enter into reactions between the above described cross-linking hydrocarbon binders to form a more strongly bonded matrix of cross-linking hydrocarbon binder and the monomer. In particular monomers which can be used in this instance include the unsaturated monomers which are selected on the basis of their volatility, relative reactivity, compatibility and desired cured physical properties. Such cross-linking monomers can include styrene, methyl methacrylate, methacrylate copolymers, other vinyl aromatics specifically including vinyl toluene or any alkyl aromatic, tertiary butyl styrene, alpha methyl styrene, monochloro styrene, isobutyl methacrylate, methyl methacrylate, diallyl mallate and other monomeric substances which can react. In some instances the monomers may be multifunctional. Depending upon the molecular weight of the optional cross-linking monomer its concentration in the product can vary anywhere from 0 up to 10 parts by weight of the total mixture.

In describing the process for molding the claimed product, one of the benefits realized is that the product can be removed from the mold while it is still substantially at the temperature at which molding operations took place. This operation is advantageous since it substantially, if not totally, eliminates the need to cool the molded product in the mold for any period of time and consequently increases the output of a molding apparatus per unit time. The process is essentially a three step procedure involving placing a blend, described above, into a mold, maintaining such material in the mold at polymerizing conditions to form a molded product and removing the molded product from the mold (before substantial cooling of the molded article has taken place).

Accordingly the composition as previously described is placed into a suitable mold which can have varying dimensions. Preferably, the mold has the same shape as the molded article which is to be produced. In a less preferable instance, the mold is large and is used to make a slab or a block of molded material which itself can be machined into the desired shape.

The polymerizing or molding conditions include suitable temperature, pressure and length of time necessary to allow the hydrocarbon cross-linking binder to cross-link with itself and with, in some instances, the surface of the ultra high molecular weight polyethylene to form a molded product. Specifically, the polymerizing or molding conditions include temperatures above about 150°F and below generally about 500°F. In an especially preferred instance the molding conditions include a temperature of anywhere from around 225°F to about 350°F.

Pressures can vary anywhere from a few to about 1000 psi in order to allow the various portions of the mold to be filled with the molding material.

It is especially preferred and one of the specific advantages in using the composition described above is that no substantial cooling need take place after the molded product has been produced in the mold. The elimination of such cooling step, being one of the specific advantages of processing the claimed composition, is generally defined in terms of a difference in skin or surface temperatures of the mold. The skin or surface temperature of the mold, which is in contact with the material being molded, should remain constant during the molding operations. In order to define the absence of cooling in a processing context it is generally preferred to remove the molded product from the mold prior to a reduction of the average skin temperature of the mold of less than about 50°F. below the average skin temperature of the mold during the molding operations. Such a definition will allow injection or compression molding to occur without active cooling taking place within the mold. Active cooling would comprise activities by and during the molding operation in which the mold itself was cooled as by pumping a cooling exchange fluid through the mold to cool it. Generally turning off the power to a mold would not be active cooling in this sense if the average skin temperature of the mold was not reduced more than 50° from the temperature of molding-that is, the temperature at which thermoplastic material is added to the mold and in which molding takes place.

In an even more preferred instance the average skin temperature of the mold during molding operations and the average skin temperature of the mold when the molded product is removed or just prior thereto are within about 25° of one another. In an even more preferable instance the average skin temperature of the mold during molding operations is substantially equal to the average skin temperature of the mold when the molded product is removed from the mold or just prior to removal. In such instances the mold is operated in an isothermal manner in order to maintain a constant temperature of the mold.

Of course in instances in which a large mass of a molded product is to be produced, a circumstance will occur in which the temperature within the molded product will be substantially higher than the skin temperature of the molded article and the skin temperature of the mold itself. In such cases the peak exotherm could be as many as 75° to 100°F or more higher than the average skin or mold temperature during the molding operations and the length of molding will be such that this peak exotherm would be allowed to be substantially reduced producing a pseudo cooled molded product with respect to the peak exotherm temperature. Accordingly, the cooling being defined by the difference of the surface or skin temperatures of the mold at selected instances, a high peak exotherm is thought to have substantially no influence on the definition of cooling as Applicants have used.

In defining the average skin or surface temperature of the mold, it is presumed that such temperature is the true arithmetic average of a representative quantity of surface or skin temperature measurements. It is assumed that the surface of the mold's skin temperature and the skin or surface temperature of the molded product which is intimately in contact with the mold skin will be substantially identical.

In referring to the skin or surface temperatures during molding operations, we generally mean the average skin or surface temperature of the mold when molding material is in the mold and during which substantial reaction of the cross-linking binder takes place.

The skin or surface temperature of the mold when the molded product is removed from the mold is the temperature measured at or immediately prior to removing the molded material from the mold. Again such temperature is an average of the representative temperatures taken of the skin temperature of the mold itself immediately preceding or at the instant at which the molded product is removed from the mold.

The overall time of processing in the mold for the molding conditions can vary and are primarily dependent on the size of the molded product. In particular when making small articles a molding time of 30 seconds or less is contemplated. In instances in which relatively larger parts are to be produced, for instance materials having one inch or greater thicknesses, it is contemplated that molding conditions with respect to time will take as many as a few minutes to form the entire mass into a molded and reacted polymerized product. The benefits in the process of using the claimed composition are still realized since no cooling period is required for any material produced using the claimed composition after it is molded but before it is removed from the mold.

In a particular instance in producing ASTM type cups, described in ASTM method D-731 FIG. 1, it was determined that a generally good cup could be molded when using operating conditions of about 300°F, 850 psig pressure, with no cooling of the mold for approximately 45 seconds.

Certain additional materials may be added to the blend which is molded in order to enhance its color and physical properties and the molding operation. If needed, mold release agents can be applied to the mold periodically during processing or can be incorporated in relatively small amounts within the composition to be molded. In other instances pigments or dyes can be incorporated into the molded products. Accelerators, oxygen inhibitors, stabilizers, plasticizers, impact modifiers or other materials known in the art can also be incorporated into the blend.

The following examples are presented to illustrate preferred embodiments of the composition and process as claimed herein and are not to be used to unduly limit the scope of the claims herein.

EXAMPLE I

In this example various compositions were molded utilizing a procedure which comprised placing each of the sample compositions into an ASTM cup mold which was maintained at about 350°F. After the material was placed in the ASTM cup mold, it was then closed and 850 psi pressure was maintained on the mold. The lengths of time that the molding operations take place are referred to in Table I below as cycle times and as indicated varied anywhere from short periods of 30 seconds up to 2 minutes.

The compositions used for sample A included essentially 100% of HiFax 1900 which is produced by the Hercules Powder Company. Sample F consisted of essentially 100 percent of UHMW polyethylene Hostalen GUR 400 produced by Hoechst of West Germany. Samples B, C, D, and E had varying amounts of cross-linking binder and a cross-linking monomer as did samples G, H, I, and J.

The cross-linking binder used, as indicated, was a block copolymer of styrene and butadiene which is substantially similar to that indicated previously in the specification having an average molecular weight of 7,000 with the A and B blocks each comprising approximately 80 percent units of butadiene and 20 percent units of styrene respectively. The catalyst utilized was a commercially available catalyst called VulCup and as indicated in Table I is a peroxide catalyst based on a diisopropylbenzene structure.

An optional cross-linking monomer was used in all the samples except those which contained essentially pure UHMW polyethylene. Such cross-linking monomer was one of those selected from the group described above when using such optional cross-linking monomers and as indicated in Table I was trimethylolpropane trimethacrylate.

As indicated in Table I the appearance of the ASTM cup was indicated in an overall manner as varying from good to poor to bad. A cup with good overall appearance had sharp definition of details with no observable defects including sharp edges and conforming to the mold the cup came from in substantially all respects. The poorly rated cups had minor but noticeable distortion, no sharp corners and no gross defects. However, the overall appearance of the cup was such that it was easily observable to not to have conformed to the mold from which the cup was removed. The cups having a bad overall appearance had substantial gross defects easily recognizable, were distorted in some instances and had an overall obvious appearance of an inferior molded product. The remaining definitions as used in Table I appear in a footnote thereof.

molded has been removed from the mold. The obvious advantage of having low shrinkage values are that the part removed from a mold will more exactly correspond with the mold dimensions.

A review of Table II below indicates that a material consisting of essentially 100 percent of the HiFax 1900 material (UHMW polyethylene) had an overall percentage of linear shrinkage of 8.2 percent. Blends of such UHMW polyethylene with a block copolymer and catalyst had less than one-half of the shrinkage value of the pure UHMW polyethylene (approximately a 3.7 percent). The hard rubber material as indicated had a 1.2 percent linear shrinkage and was about as small a linear shrinkage as is possible in the present area of technology.

The molding conditions used to produce the specimens used in determining the linear shrinkage clacula-

TABLE I

| Parts by Weight | A | B | C | D | E | F | G | H | I | J |
|---|---|---|---|---|---|---|---|---|---|---|
| UHMWPE: | | | | | | | | | | |
| HiFax 1900 | 100 | 90 | 90 | 80 | 80 | — | — | — | — | — |
| Gur 400 | — | — | — | — | — | 100 | 95 | 90 | 85 | 80 |
| Cross-Linking Binder[1] | — | 10 | 10 | 20 | 20 | — | 5 | 10 | 15 | 20 |
| Catalyst[2] | — | 1 | 1 | 1 | 1 | — | 1 | 1 | 1 | 1 |
| Cross-Linking Monomer[3] | — | 0.5 | 0.5 | 1 | 1 | — | 0.25 | 0.5 | 0.75 | 1 |

APPEARANCE OF ASTM CUPS

| Overall Appearance | B | G | G | G | G | P | G | G | G | G |
|---|---|---|---|---|---|---|---|---|---|---|
| Cycle Times | | | | | | | | | | |
| 2 min. | D | G | G | — | — | D | G | G | G | G |
| 1 min. | DC | G | G | — | — | D | G | G | G | G |
| 45 sec. | — | — | G | — | — | DC | G | G | — | — |
| 30 sec. | — | NF | NF | — | — | NF | NF | NF | NF | NF |

[1]Block copolymer of styrene and butadiene
[2]VulCup (A,A'-bis(t-butyl peroxy)diisopropylbenzene
[3]Trimethylolpropane trimethacrylate
B = Bad
C = Cracks
D = Distortions
G = Good, sharp definition of details with no defects
NF = Not fully fluxed
P = Poor, general lack of definition of details and overall shape As can be seen from the data in Table I above samples A and E which were essentially 100 percent weight of a UHMWPE material are substantially inferior in all molding cycle times. The remaining samples which contain the preferred composition claimed herein containing a UHMWPE, a cross-linking binder material, catalyst and an optional cross-linking monomer, were superior in essentially all respects.

EXAMPLE II

In this example an experimental mold having dimensions as indicated in Table II below was used for molding a material consisting essentially of 100 percent of a HiFax 1900 UHMW polyethylene, a blend of such UHMW polyethylene with a block copolymer and catalyst, and a control sample which comprised a hard rubber molding compound.

The hard rubber battery molding compound was used as a control since this material is known to possess the attributes of an excellent molding composition in that it maintains exceptional integrity and has substantially little, if any, linear shrinkage after the material tions in Table II consisted of 15 minute molding period in which the mold was maintained at 360°F during the entire molding operation. The pressure maintained in the mold was approximately 2800 psi pressure. The molded specimens were removed from the mold with no cooling therein.

The appearance of the three compounds molded in Table II were as follows. The pure UHMW polyethylene material (100 percent HiFax 1900) contained noticeable distortions, bubbles, crazes, had warped sides and extremely poor corners and edges. Such part was considerably inferior and an overall observation of such part would indicate it is totally unsuitable for use as a molded material. The blend 90 percent of the UHMW polyethylene block copolymer and catalyst when observed had very good definition with only a slight craze on one side (one of the more intricate portions of the molded product) and it was considered to be a generally good part and suitable for sale as a molded product. The hard rubber case, of course, had excellent definition with no observable defects even at the most intricate portions of the molded material.

TABLE II

|  | Mold Dimensions, Inches | | | | % Linear |
|---|---|---|---|---|---|
|  | Inside Edge | | Outside Edge | | |
|  | length | width | length | width | shrinkage |
| Molding Compound | 5.572 | 2.364 | 6.010 | 2.799 | — |
| 100% HiFax 1900 | 5.197 | 2.090 | 5.621 | 2.547 | |
|  | — | 2.135 | — | 2.574 | 8.2 |
|  | — | 2.132 | — | 2.518 | |
| 90% HiFax 1900 | 5.342 | 2.280 | 5.766 | 2.700 | |
| 10% Block Copolymer[1] | — | 2.288 | — | 2.717 | 3.7 |
|  | — | 2.275 | — | 2.713 | |
| Hard Rubber | 5.509 | 2.336 | 5.933 | 2.767 | |
|  | — | 2.332 | — | 2.764 | 1.2 |
|  | — | 2.333 | — | 2.766 | |

[1]Contained as catalyst 1 part VulCup R and 0.5 part trimethylolpropane trimethacrylate as cross-linking monomer.

EXAMPLE III

In this example samples of compositions blended according to the compositions claimed herein and a composition consisting of 100 percent of a UHMW polyethylene were molded and tested for various physical properties. As indicated on the following Table III the tensile strength was tested using ASTM method D-638 at 2.0 inches per minute.

The flexural strength was tested using the ASTM method D-790 at 1.1 inches per minute. The Izod impact (notched) was tested using ASTM method D-256.

The Taber abrasion was tested using a modified testing procedure. The coefficient of friction was tested using the ASTM method D-1894 for static and kinetic tests.

TABLE III

| Components, Part by Wt. | | K | L | M | N | O | P | Q | R |
|---|---|---|---|---|---|---|---|---|---|
| Ricon 150 | cross-linking binder | | 95.0 | 5.0 | 43.0 | | | | |
| Ricon 100 | | | | 13.0 | | | | | |
| Ricon 429 | | | | | | | | | |
| A-B Block | (669-54)* | | | | | 400.0 | 455.0 | | |
| A-B Block | (669-54)* | | | | | | | 12.5 | 25.0 |
| TMPTM (cross-linking monomer) | | | 5.0 | 2.0 | 2.0 | 5.0 | | 0.25 | 0.25 |
| VulCup R (catalyst) | | | 1.5 | 1.5 | 1.5 | 4.0 | 150 | 1.0 | 1.0 |
| Gur 400 (UHMWPE) | | | 400.0 | 80 | — | 823.0 | 750.0 | — | 90.0 |
| HiFax 1900 (UHMWPE) | | 100.0 | — | — | 55.0 | — | — | 95 | — |
| Physical Properties | | | | | | | | | |
| Tensile Strength, PSI | | 4300 | 2400 | 2240 | 2500 | 2900 | — | 2400 | 2600 |
| % Elongation | | 210 | 58 | 86 | 30 | 206 | | 118 | 109 |
| Flexural Strength, PSI | | 2500 | 2040 | 2120 | 2200 | — | — | — | — |
| Izod Impact, FPPI | | 15.1 | 4.9 | 4.8 | 1.5 | 12.8 | — | 11.1 | 9.3 |
| Taber Abrasion | | 22 | 45 | 53 | 90 | 57 | — | 67 | 72 |
| Coefficient of Friction | | | | | | | | | |
| Static | | 0.24 | — | — | 0.23 | — | — | — | — |
| Kinetic | | 0.17 | — | — | 0.22 | — | — | — | — |

*A-B block copolymers of styrene and butadiene, 80 weight percent butadiene and 20 weight percent styrene, approximate molecular weight 40,000, used as cross-linking binders.

We claim as our invention:

1. A curable composition comprising a blend of:
A. from about 50 to about 99 parts by weight of a polyethylene polymer having a molecular weight of greater than about 1.5 million;
B. from about 1 to about 50 parts by weight of a cross-linking hydrocarbon binder comprising copolymers of butadiene and vinyl aromatics said butadiene having at least 50 percent 1, 2, vinyl unsaturated units; and C. from about 0.1 to about 5 parts by weight of a free radical initiating cross-linking catalyst.

2. claim 1 in that said molecular weight is greater than about two million and less than about 5 million.

3. claim 1 in that said copolymers of butadiene and vinyl aromatics contain butadiene units comprising the following structural formula:

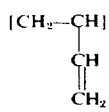

4. claim 1 in that said copolymers of butadiene and vinyl aromatics is a graft copolymer and contains butadiene comprising the following structural formula:

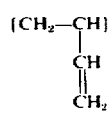

5. claim 3 in that said vinyl aromatic is styrene.

6. claim 4 in that said vinyl aromatic is selected from the group consisting of styrene and vinyl toluene.

7. claim 1 in that said copolymers of butadiene and vinyl aromatics contain the following structural formula:

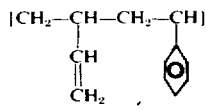

8. claim 1 in that said copolymers of butadiene and vinyl aromatics contain the following structural formula:

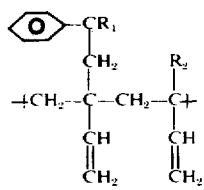

wherein $R_1$ is hydrogen or styrene and $R_2$ is hydrogen, styrene or a recurring structure having the following structural formula:

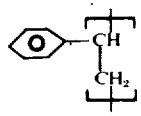

9. claim 1 in that said copolymers of butadiene and vinyl aromatics contain the following structure:

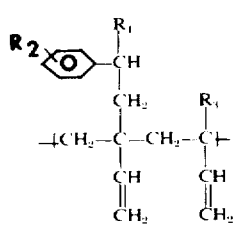

wherein $R_2$ is alkyl having from one to ten carbon atoms, $R_1$ and $R_3$ each are hydrogen or a structure having the following structural formula:

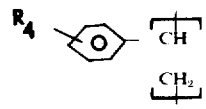

wherein $R_4$ is alkyl having from one to ten carbon atoms.

10. claim 1 in that said curable composition contains a cross-linking monomer.

11. claim 10 in that said cross-linking monomer is selected from the group consisting of styrene, vinyl toluene, divinyl benzene, trimethyl propane trimethacrylate, ethylene glycol dimethacrylate.

12. claim 1 in that said cross-linking catalyst is selected from the group consisting of t-butyl perbenzoate, di-α-cumyl peroxide, 2,5 di(t-butylperoxy), 2,5-dimethyl hexane and A,A'-bis (t-butylperoxy) diisopropylbenzene.

13. claim 1 in that said composition comprises from about 80 to about 99 parts by weight of said polyethylene polymer, from about 8 to about 12 parts of said cross-linking binder and from 0.5 to about 2 parts by weight of said cross-linking catalyst.

14. A process for molding articles from a polyethylene polymer having a molecular weight of greater than about 1.5 million, which process comprises:

A. placing in a suitable mold a blend of:
1. from about 50 to about 99 parts by weight of said polyethylene;
2. from about 1 to about 50 parts by weight of a cross-linking hydrocarbon binder comprising copolymers of butadiene and vinyl aromatics said butadiene having at least 50 percent 1, 2, vinyl unsaturated units; and
3. from about 0.1 to about 5 parts by weight of free radical initiating cross-linking catalyst, B. cross-linking said blend at molding conditions including a molding temperature above about 150°F. to form a molded product;

C. removing said molded product from the mold prior to a reduction of the average skin temperature of the mold of less than about 50°F. below the average skin temperature of the mold at said molding temperature.

15. claim 14 in that said copolymer of butadiene and vinyl aromatics contain the following structural formula:

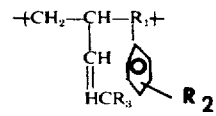

wherein $R_1$ is alkyl of from 2 to 10 carbon atoms and $R_2$ and $R_3$ are each hydrogen or alkyl having from 1 to 10 carbon atoms.

16. claim 14 in that said copolymer of butadiene and vinyl aromatics contain the following structural formula:

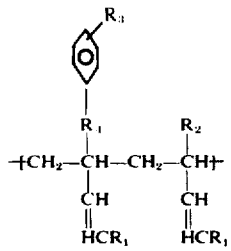

wherein $R_1$ or $R_3$ are each hydrogen or alkyl having from 1 to 10 carbon atoms, $R_2$ is hydrogen, vinyl aromatic or a recurring vinyl aromatic and $R_4$ is alkyl having from 2 to about 10 carbon atoms.

17. claim 14 in that said A-B block copolymer of butadiene and vinyl aromatic contain the following structural formula:

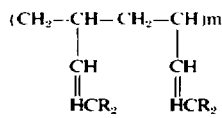 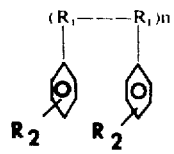

wherein $R_1$ is alkyl having from about 2 to about 10 carbon atoms and $R_2$ is hydrogen or alkyl having from about one to about 10 carbon atoms, m varies from about 10 to about 1,000 and n varies from about 10 to about 1,000.

18. claim 14 in that the average skin temperature of the mold during molding operations and when said molded product is removed from the mold varies by less than about 25°F.

19. claim 14 in that the average skin temperature of the mold during molding operations is substantially equal to the average skin temperature of the mold when the molded product is removed from the mold.

* * * * *